United States Patent
Pao

(10) Patent No.: US 10,477,436 B2
(45) Date of Patent: Nov. 12, 2019

(54) DEVICE AND METHOD OF HANDLING TRANSMISSION IN UNLICENSED BAND

(71) Applicant: ACER INCORPORATED, New Taipei (TW)

(72) Inventor: Wei-Chen Pao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 117 days.

(21) Appl. No.: 15/456,588

(22) Filed: Mar. 13, 2017

(65) Prior Publication Data
US 2017/0272981 A1 Sep. 21, 2017

Related U.S. Application Data

(60) Provisional application No. 62/308,241, filed on Mar. 15, 2016.

(51) Int. Cl.
*H04W 28/26* (2009.01)
*H04W 72/04* (2009.01)
*H04W 72/12* (2009.01)
*H04W 74/08* (2009.01)

(52) U.S. Cl.
CPC ....... *H04W 28/26* (2013.01); *H04W 72/0413* (2013.01); *H04W 72/0446* (2013.01); *H04W 72/121* (2013.01); *H04W 74/0816* (2013.01)

(58) Field of Classification Search
CPC ............. H04W 16/14; H04W 74/0816; H04W 74/0808; H04W 72/0413; H04W 72/0446; H04W 72/0453; H04W 74/08; H04W 28/26; H04W 72/121
See application file for complete search history.

(56) References Cited

U.S. PATENT DOCUMENTS

| | | | |
|---|---|---|---|
| 2015/0173056 A1* | 6/2015 | Yerramalli | H04W 16/14 370/329 |
| 2015/0304911 A1 | 10/2015 | Wang | |
| 2016/0174222 A1* | 6/2016 | Zhang | H04W 72/0446 370/329 |
| 2016/0309354 A1* | 10/2016 | Yerramalli | H04W 24/08 |
| 2017/0223635 A1* | 8/2017 | Dinan | H04W 52/146 |
| 2017/0238311 A1* | 8/2017 | Hooli | H04W 74/0816 370/329 |

(Continued)

OTHER PUBLICATIONS

Institute for Information Industry (III), Discussion on LAA Uplink Channel Access, 3GPP TSG RAN WG1 meeting #84, R1-160989, XP051054293, Feb. 15-19, 2016, St Julian's, Malta.

(Continued)

*Primary Examiner* — Margaret G Mastrodonato
(74) *Attorney, Agent, or Firm* — Winston Hsu

(57) ABSTRACT

A communication device for handling a transmission in an unlicensed band comprises a storage unit for storing instructions and a processing circuit coupled to the storage unit. The process sing circuit is configured to execute the instructions stored in the storage unit. The instructions comprise receiving a configuration for an occupancy of an unlicensed band; performing a clear channel assessment (CCA) in a time interval of the unlicensed band; performing an uplink (UL) transmission in a first subframe of the unlicensed band according to a result of the CCA; and transmitting a reservation signal near a boundary of the first subframe according to the configuration.

23 Claims, 14 Drawing Sheets

(56) References Cited

U.S. PATENT DOCUMENTS

2018/0103458 A1* 4/2018 Tooher ................ H04W 16/14
2018/0343589 A1* 11/2018 Li ...................... H04W 74/08
2019/0053222 A1* 2/2019 Bhorkar .............. H04W 16/14

OTHER PUBLICATIONS

Institute for Information Industry (III), UL Transmission for LAA, 3GPP TSG RAN WG2 #90, R2-152343, XP050972036, May 25-29, 2015, Fukuoka, Japan.

Intel Corporation, Uplink transmission for LAA, 3GPP TSG-RAN WG2 Meeting #90, R2-152214, XP050973840, May 25-29, 2015, pp. 1-5, Fukuoka, Japan.

* cited by examiner

DEVICE AND METHOD OF HANDLING TRANSMISSION IN UNLICENSED BAND

CROSS REFERENCE TO RELATED APPLICATIONS

This application claims the benefit of U.S. Provisional Application No. 62/308,241 filed on Mar. 15, 2016, which is incorporated herein by reference.

BACKGROUND OF THE INVENTION

1. Field of the Invention

The present invention relates to a communication device and a method used in a wireless communication system, and more particularly, to a communication device and a method of handling a transmission in an unlicensed band in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

Network operators propose to offload network traffic of the LTE/LTE-A system to an unlicensed band, to ease load of the network traffic. For example, the eNB may provide services to the UE via both a licensed band and the unlicensed band. However, even if the UE is scheduled by the eNB to perform a UL transmission at a first time instant in the unlicensed band, the UE may not be able to complete the UL transmission due to uncertainty of available resource of the unlicensed band. That is, there may not be available resource (i.e., clean channel) for performing the UL transmission. For example, the resource of the unlicensed band may be occupied by another communication device operating a different communication standard (e.g., IEEE 802.11). Accordingly, communication operations between the UE and the eNB is affected, and throughput of the UE is degraded. Benefit of introduction of the unlicensed band is reduced. Thus, how to handle a transmission in the unlicensed band is an important problem to be solved.

SUMMARY OF THE INVENTION

The present invention therefore provides a method and related communication device for handling a UL transmission to solve the abovementioned problem.

A communication device for handling a transmission in an unlicensed band comprises a storage unit for storing instructions and a processing circuit coupled to the storage unit. The process sing circuit is configured to execute the instructions stored in the storage unit. The instructions comprise receiving a configuration for an occupancy of an unlicensed band; performing a clear channel assessment (CCA) in a time interval of the unlicensed band; performing an uplink (UL) transmission in a first subframe of the unlicensed band according to a result of the CCA; and transmitting a reservation signal near a boundary of the first subframe according to the configuration.

A network for handling a reception in an unlicensed band comprises a storage unit for storing instructions and a processing circuit coupled to the storage unit. The process sing circuit is configured to execute the instructions stored in the storage unit. The instructions comprise transmitting a configuration for an occupancy of an unlicensed band to a communication device; transmitting a reservation signal near a boundary of a first subframe according to the configuration; and performing an uplink (UL) reception in the first subframe of the unlicensed band from the communication device, after transmitting the reservation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
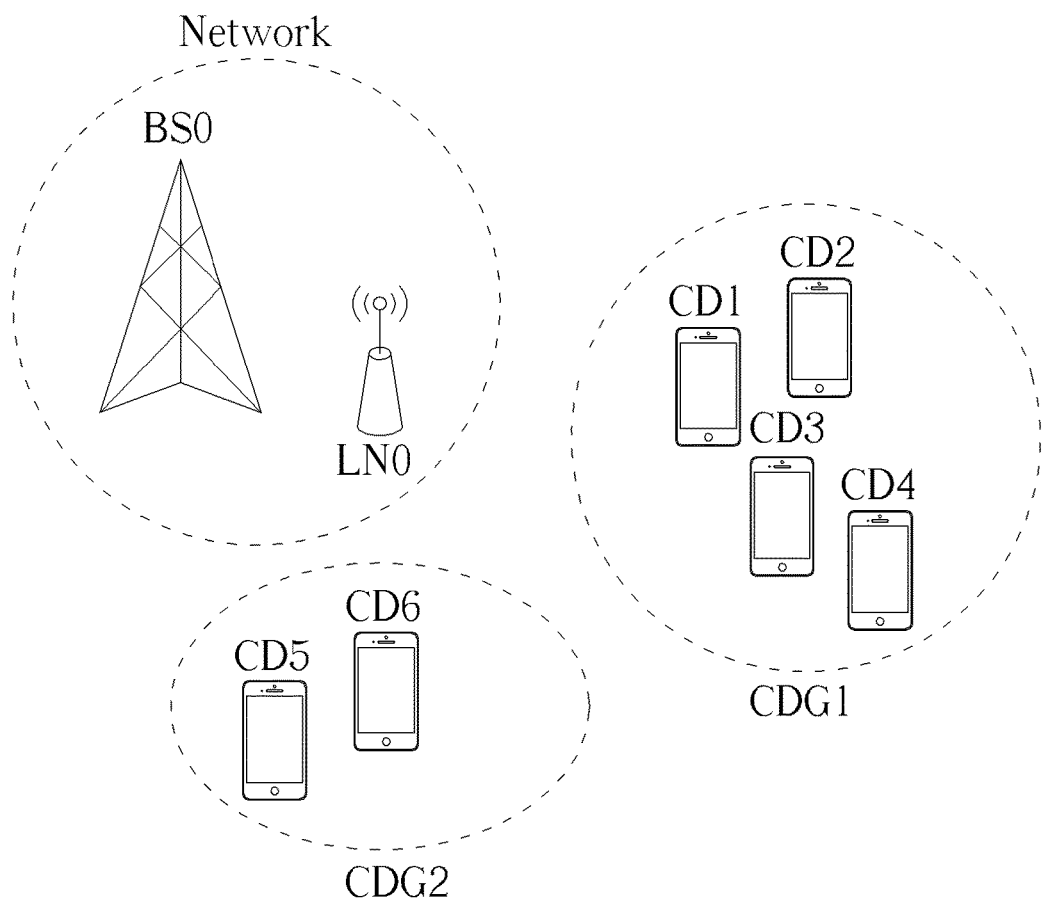
FIG. 1 is a schematic diagram of a wireless communication system according to an example of the present invention.

FIG. 1 is a schematic diagram of a wireless communication system 10 according to an example of the present invention. The wireless communication system 10 includes a network and communication device groups CDG1-CDG2. In detail, the network includes a base station BS0 and a licensed-assisted access (LAA) node LN0. The communication device group CDG1 includes communication devices CD1-CD4, and the communication device group CDG2 includes communication devices CD5-CD6. A criterion based on which the communication device groups CDG1-CDG2 are established is not limited herein. For example, the communication device groups CDG1-CDG2 may be established according to geographic locations of the communication devices CD1-CD6. In another example, there may be no grouping for the communication devices CD1-CD6, i.e., all the communication devices CD1-CD6 belong to a same group. A communication device may communicate with the LAA node LN0, may communicate with the base station BS0 directly, or may communicate with the base station BS0 via the LAA node LN0, when communicating with the network.

The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices CD1-CD6 are simply utilized for illustrating the structure of the wireless communication system 10. Practically, the network (e.g., the base station BS0 and/or the LAA node LN0) may be a universal terrestrial radio access network (UTRAN) including at least one Node-B (NB) (e.g., the base station BS0 and/or the LAA node LN0) in a universal mobile telecommunications system (UMTS). In one example, the network may be an evolved UTRAN (E-UTRAN) including at least one evolved NB (eNB) and/or at least one relay station (e.g., the base station BS0 and/or the LAA node LN0) in a long term evolution (LTE) system, a LTE-Advanced (LTE-A) system or an evolution of the LTE-A system.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device in FIG. 1 may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network (e.g., the base station BS0 and/or the LAA node LN0) and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
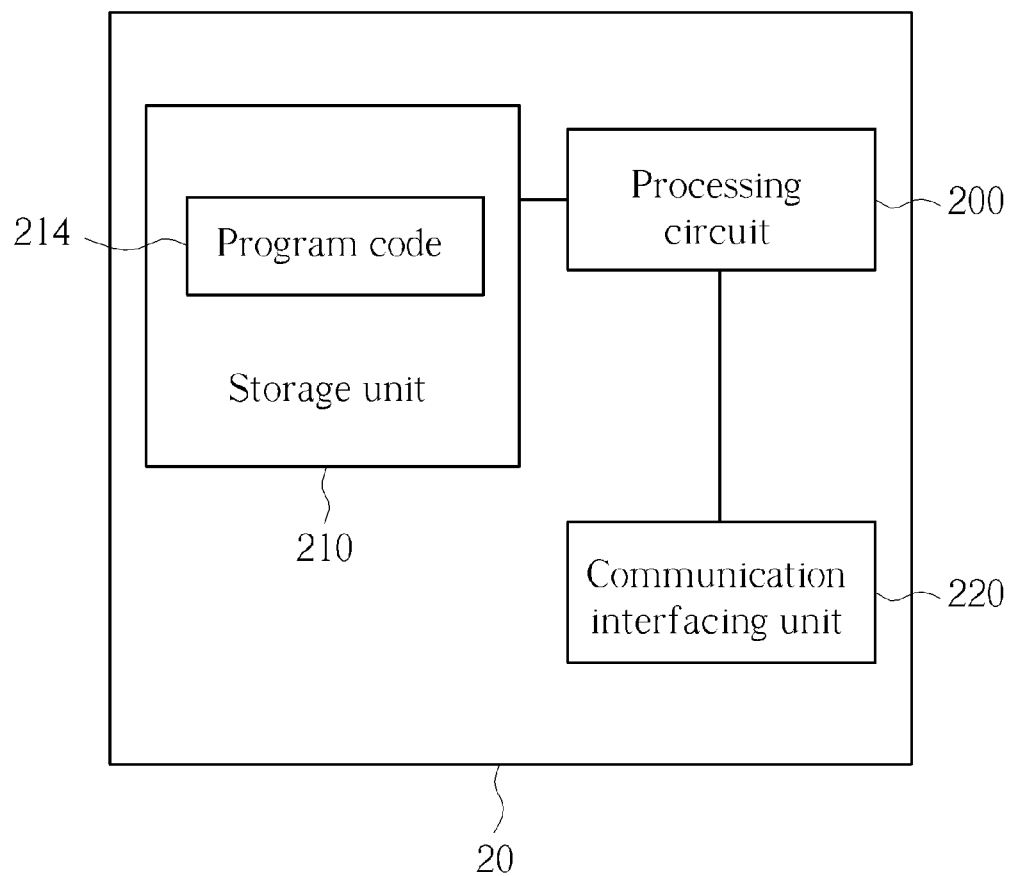
FIG. 2 is a schematic diagram of a communication device according to an example of the present invention.

FIG. 2 is a schematic diagram of a communication device 20 according to an example of the present invention. The communication device 20 may be any of the communication devices CD1-CD6, the base station BS0 and/or the LAA node LN0 shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

Figure 3:
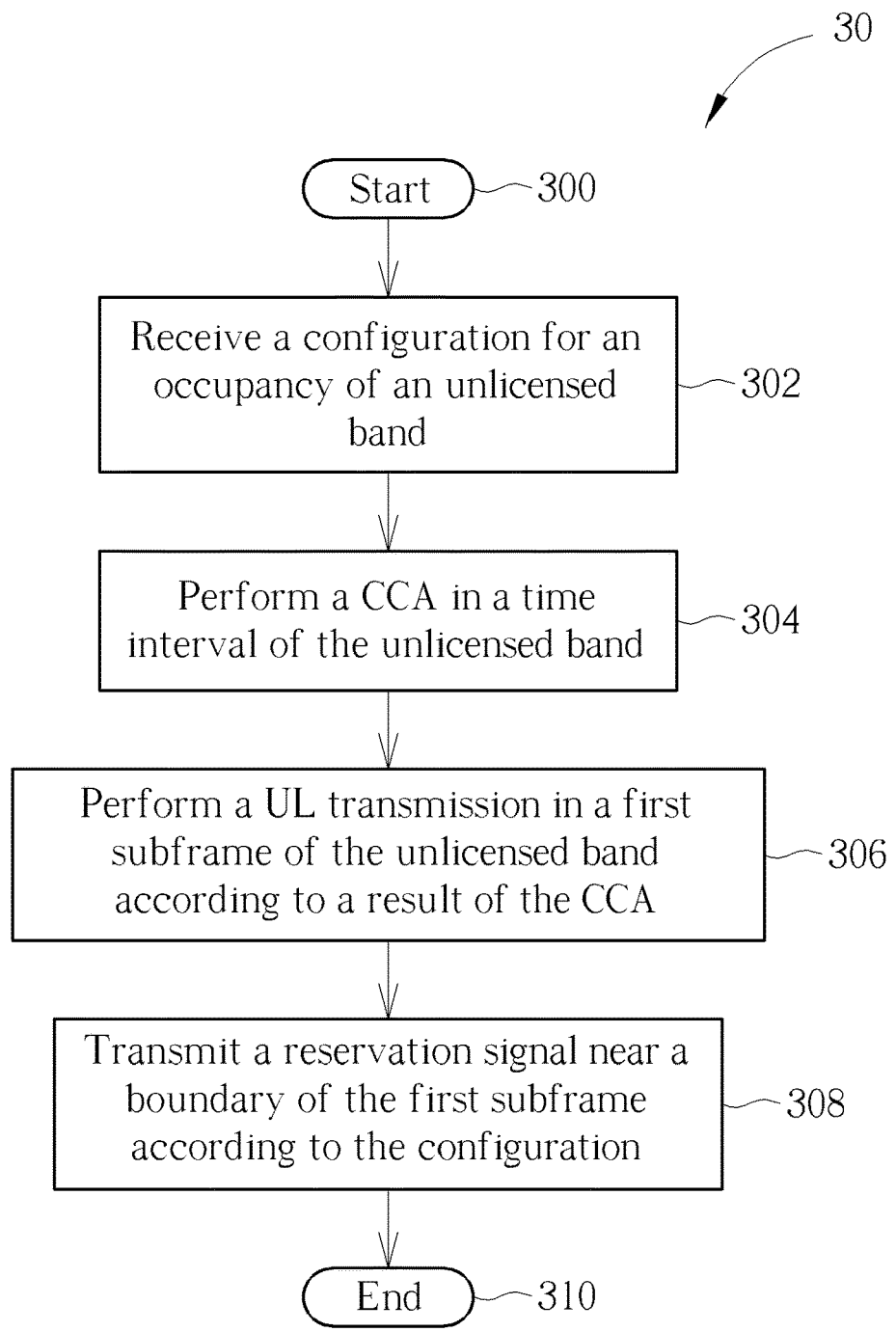
FIG. 3 is a flowchart of a process according to an example of the present invention.

FIG. 3 is a flowchart of a process 30 according to an example of the present invention. The process 30 may be utilized in a communication device (e.g., the communication device CD1) shown in FIG. 1, to handle a transmission. The process 30 may be compiled into the program code 214 and includes the following steps:

Step 300: Start.

Step 302: Receive a configuration for an occupancy of an unlicensed band.

Step 304: Perform a clear channel assessment (CCA) in a time interval of the unlicensed band.

Step 306: Perform a UL transmission in a first subframe of the unlicensed band according to a result of the CCA.

Step 308: Transmit a reservation signal near a boundary of the first subframe according to the configuration.

Step 310: End.

According to the process 30, the communication device may receive a configuration for an occupancy of an unlicensed band, e.g., from the network (e.g., the base station BS0 and/or the LAA node LN0). The communication device may perform a CCA in a time interval of the unlicensed band. The communication device may perform a UL transmission in a first subframe of the unlicensed band (e.g., to the network) according to a result of the CCA. Note that the communication device may intend to perform the UL transmission according to a UL grant transmitted by the network. The communication device may transmit a reservation signal near a boundary of the first subframe according to the configuration, e.g., after performing the UL transmission. That is, the communication device may perform the UL transmission, if the result of the CCA indicates that the time interval is clear. Then, the communication device may transmit the reservation signal near the boundary of the first subframe to occupy resources of the unlicensed band for itself and/or other communication devices (e.g., any of the communication devices CD2-CD6) in the same system (e.g., LTE system, LTE-A system, etc.). Thus, resources of the unlicensed band can be occupied by the communication device, and preemption of the resources of the unlicensed band by a communication device operating a different communication standard is avoided. As a result, performance of the communication device in the unlicensed band may approach that in the licensed band.

Realization of the process 30 is not limited to the above description. The following examples may be applied for realizing the process 30.

In one example, the configuration may include a sequence (e.g., preamble sequence, code sequence, orthogonal sequence) for transmitting the reservation signal. In one example, the communication device may transmit an assistance information (e.g., a geographic location of the communication device, a measurement result obtained by the communication device) related to the configuration (e.g., to the network). Accordingly, the network may generate the configuration according to the assistance information.

In one example, the reservation signal may be transmitted at an end of the first subframe, may be transmitted at a start of a second subframe after the first subframe, or may be transmitted at an end of a third subframe before the first subframe. In one example, the communication device may further transmit the reservation signal in at least one subframe before the first subframe according to the configuration, after performing the CCA.

In one example, the result of the CCA may indicate that the time interval is clear, if the reservation signal is detected by the communication device. That is, the reservation signal may also be transmitted by the network or other communication devices (e.g., any of the communication devices CD2-CD6), to occupy the resources of the unlicensed band. The communication device many determine that the time interval is clear, if the reservation signal is detected.

In one example, the communication device may belong to a first communication device group comprising a first plurality of communication devices, and the reservation signal may be transmitted to the first plurality of communication devices. Taking FIG. 1 as an example, the communication device CD1 may transmit the reservation signal to the communication devices CD2-CD4. In one example, the communication device may be selected (e.g., by the network) for performing the CCA. That is, the communication device is a representative for performing the CCA in the first communication device group, and the other communication devices do no need to perform the CCA. In one example, the communication device may be selected (e.g., by the network) for transmitting the reservation signal for the first communication device group. That is, the communication device is a representative for transmitting the reservation signal in the first communication device group, and the other communication devices do no need to transmit the reservation signal. In one example, the first communication device group may be established according to a plurality of geographic locations of the first plurality of communication devices. In one example, the reservation signal may be specific for the first communication device group. That is, the reservation signal may not be used or recognized by a second communication device group. In one example, the reservation signal may be specific for the first communication device group and a second communication device group comprising a second plurality of communication devices. That is, the reservation signal may be used or recognized by multiple communication device groups. A communication device in the second communication device group may determine that the unlicensed band is clear, if it detects the reservation signal transmitted by a communication device in the first communication device group.

Figure 4:
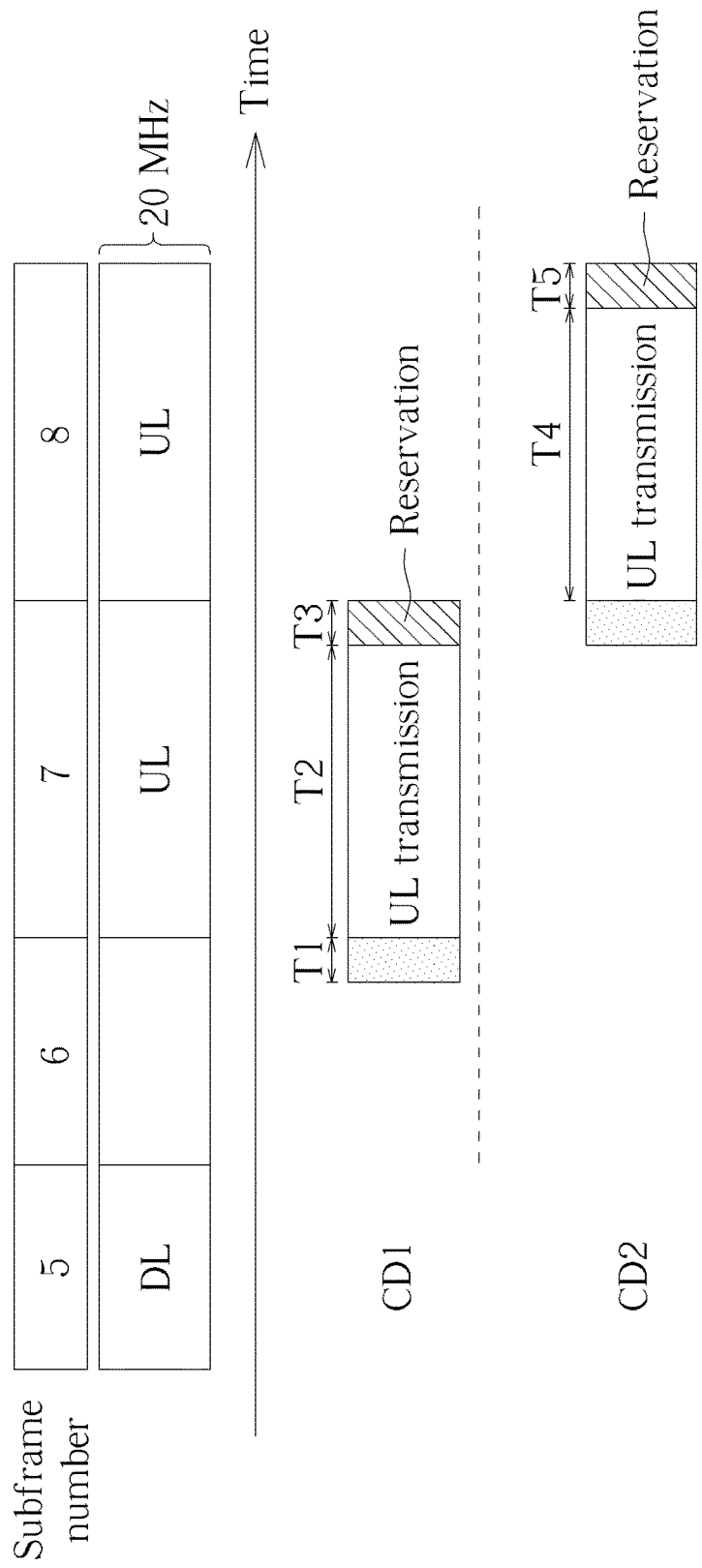
FIG. 4 is a schematic diagram of UL transmissions in an unlicensed band according to an example of the present invention.

FIG. 4 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD2 are considered to simplify the illustration. The communication device CD1 performs a CCA in a time interval T1 of the subframe 6. A result of the CCA may indicate that the time interval T1 is clear. Accordingly, the communication device CD1 performs a UL transmission with the network in a time interval T2 of the subframe 7. For example, the communication device CD1 may perform the UL transmission via one or more subcarriers of the time interval T2. The communication device CD1 transmits a reservation signal near a boundary of the subframe 7 according to a configuration for an occupancy of the unlicensed band transmitted by the network, after performing the UL transmission. In the present example, the communication device CD1 transmits the reservation signal in a time interval T3 of the subframe 7, i.e., the end of the subframe 7.

The communication device CD2 detects the reservation signal in the time interval T3 and determines that the unlicensed band is clear, after performing the CCA in the time interval T3. Similar to the operation of the communication device CD1, the communication device CD2 performs a UL transmission with the network in a time interval T4 of the subframe 8. For example, the communication device CD2 may perform the UL transmission via one or more subcarriers of the time interval T4. The communication device CD2 also transmits a reservation signal near a boundary of the subframe 8 according to a configuration for the occupancy of the unlicensed band transmitted by the network, after performing the UL transmission. In the present example, the communication device CD2 transmits the reservation signal in a time interval T5 of the subframe 8, i.e., the end of the subframe 8. As can be seen, resources of the unlicensed band can be occupied by the communication devices CD1-CD2, and preemption of the resources of the unlicensed band by a communication device operating a different communication standard is avoided. Thus, performance of the communication devices CD1-CD2 in the unlicensed band may approach that in the licensed band.

Figure 5:
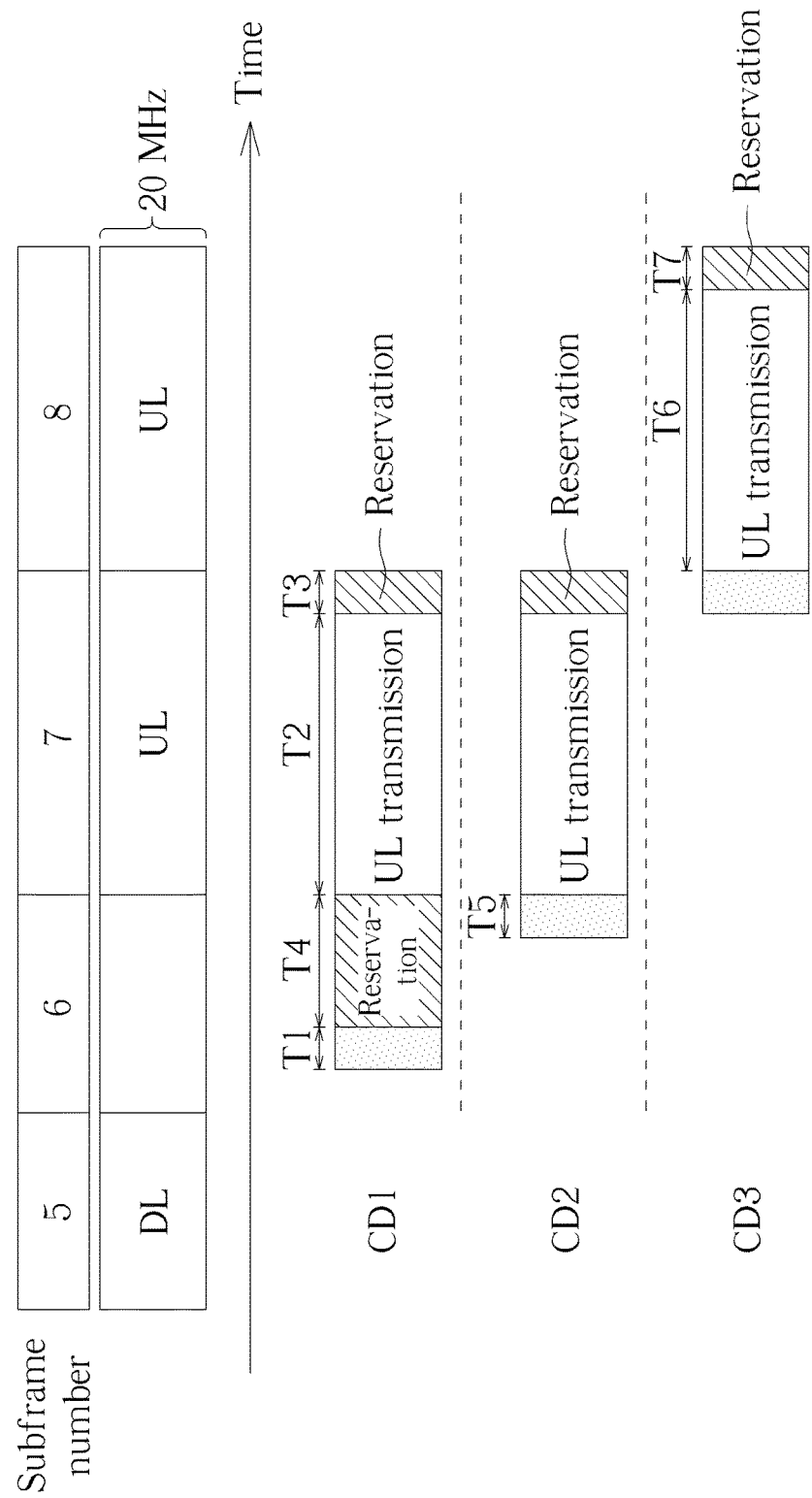
FIG. 5 is a schematic diagram of UL transmissions in an unlicensed band according to an example of the present invention.

FIG. 5 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD3 are considered to simplify the illustration. The communication device CD1 performs a CCA in a time interval T1 of the subframe 6. A result of the CCA may indicate that the time interval T1 is clear. Accordingly, the communication device CD1 performs a UL transmission with the network in a time interval T2 of the subframe 7. For example, the communication device CD1 may perform the UL transmission via one or more subcarriers of the time interval T2. The communication device CD1 transmits a reservation signal near a boundary of the subframe 7 according to a configuration for an occupancy of the unlicensed band transmitted by the network, after performing the UL transmission. In the present example, the communication device CD1 transmits the reservation signal in a time interval T3 of the subframe 7, i.e., the end of the subframe 7. In addition, the communication device CD1 may further transmit the reservation signal in a time interval T4 of the subframe 6 according to the configuration, after performing the CCA.

The communication device CD2 detects the reservation signal in the time interval T4 and determines that the unlicensed band is clear, after performing the CCA in a time interval T5 of the subframe 6. Similar to the operation of the communication device CD1, the communication device CD2 performs a UL transmission with the network in the time interval T2 of the subframe 7. For example, the communication device CD2 may perform the UL transmission via one or more subcarriers of the time interval T2. The communication device CD2 also transmits a reservation signal near a boundary of the subframe 7 according to a configuration for the occupancy of the unlicensed band transmitted by the network, after performing the UL transmission. In the present example, the communication device CD2 transmits the reservation signal in the time interval T3 of the subframe 7, i.e., the end of the subframe 7.

The communication device CD3 detects the reservation signal in the time interval T3 and determines that the unlicensed band is clear, after performing the CCA in the time interval T3 of the subframe 7. Similar to the operation of the communication device CD1, the communication device CD3 performs a UL transmission with the network in a time interval T6 of the subframe 8. For example, the communication device CD3 may perform the UL transmission via one or more subcarriers of the time interval T6. The communication device CD3 also transmits a reservation signal near a boundary of the subframe 8 according to a configuration for the occupancy of the unlicensed band transmitted by the network, after performing the UL transmission. In the present example, the communication device CD3 transmits the reservation signal in a time interval T7 of the subframe 8, i.e., the end of the subframe 8. As can be seen, resources of the unlicensed band can be occupied by the communication devices CD1-CD3, and preemption of the resources of the unlicensed band by a communication device operating a different communication standard is avoided. Thus, performance of the communication devices CD1-CD3 in the unlicensed band may approach that in the licensed band.

Figure 6:
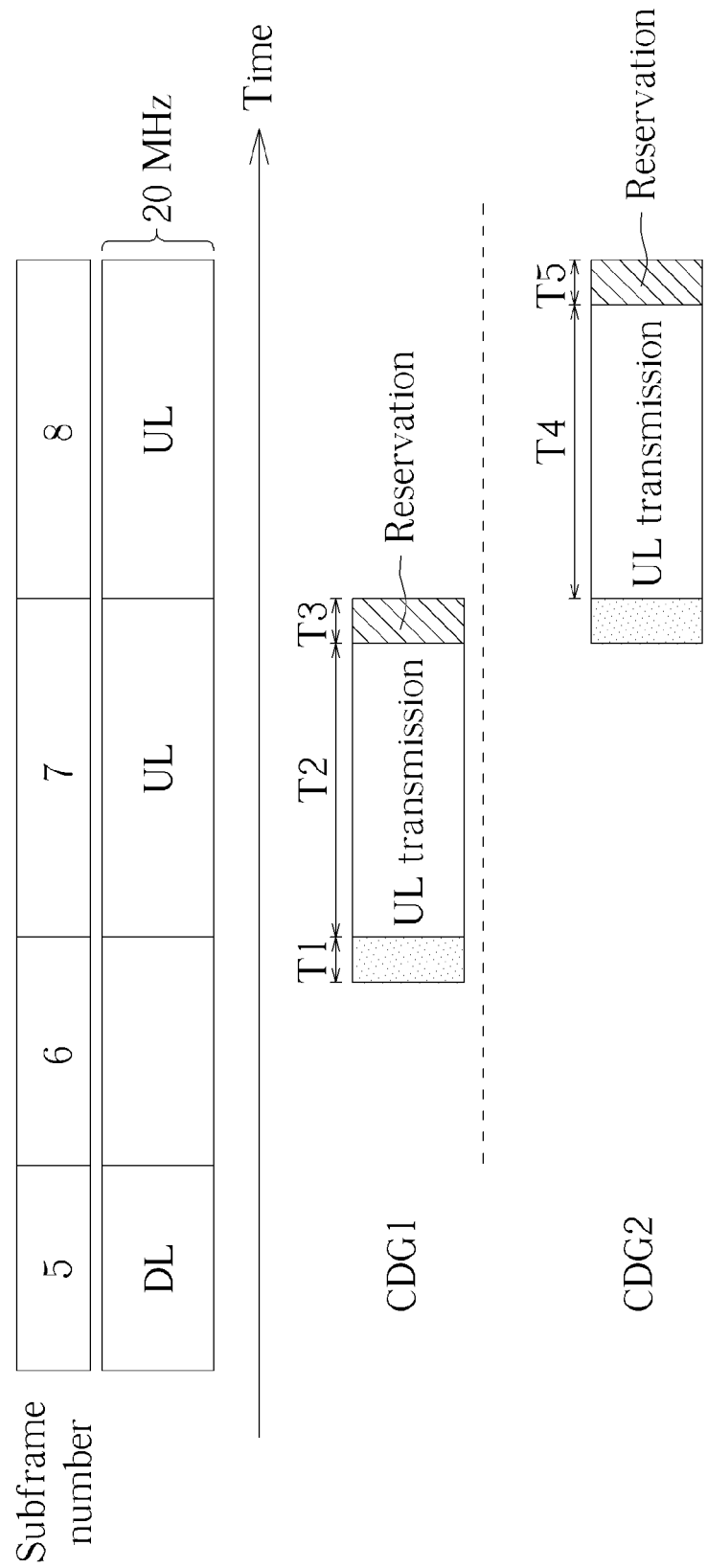
FIG. 6 is a schematic diagram of UL transmissions in an unlicensed band according to an example of the present invention.

FIG. 6 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. The communication device group CDG1 (i.e., one or more of the communication devices CD1-CD4) performs CCA(s) in a time interval T1 of the subframe 6. Result(s) of the CCA(s) may indicate that the time interval T1 is clear. Accordingly, the communication device group CDG1 performs UL transmission(s) with the network in a time interval T2 of the subframe 7. For example, the communication device group CDG1 may perform the UL transmission(s) via one or more subcarriers of the time interval T2. The communication device group CDG1 transmits reservation signal(s) near a boundary of the subframe 7 according to a configuration for an occupancy of the unlicensed band transmitted by the network, after performing the UL transmission(s). In the present example, the communication device group CDG1 transmits the reservation signal(s) in a time interval T3 of the subframe 7, i.e., the end of the subframe 7.

The communication device group CDG2 (i.e., one or more of the communication devices CD5-CD6) detects the reservation signal(s) in the time interval T3 and determines that the unlicensed band is clear, after performing CCA(s) in the time interval T3 of the subframe 7. Similar to the operation of the communication device group CDG1, the communication device group CDG2 performs UL transmission(s) with the network in a time interval T4 of the subframe 8. For example, the communication device group CDG2 may perform the UL transmission(s) via one or more subcarriers of the time interval T4. The communication device group CDG2 also transmits reservation signal(s) near a boundary of the subframe 8 according to a configuration for the occupancy of the unlicensed band transmitted by the network, after performing the UL transmission(s). In the present example, the communication device group CDG2 transmits the reservation signal(s) in a time interval T5 of the subframe 8, i.e., the end of the subframe 8. As can be seen, resources of the unlicensed band can be occupied by the communication device groups CDG1-CDG2, and preemption of the resources of the unlicensed band by a communication device operating a different communication standard is avoided. Thus, performance of the communication device groups CDG1-CDG2 in the unlicensed band may approach that in the licensed band.

Figure 7:
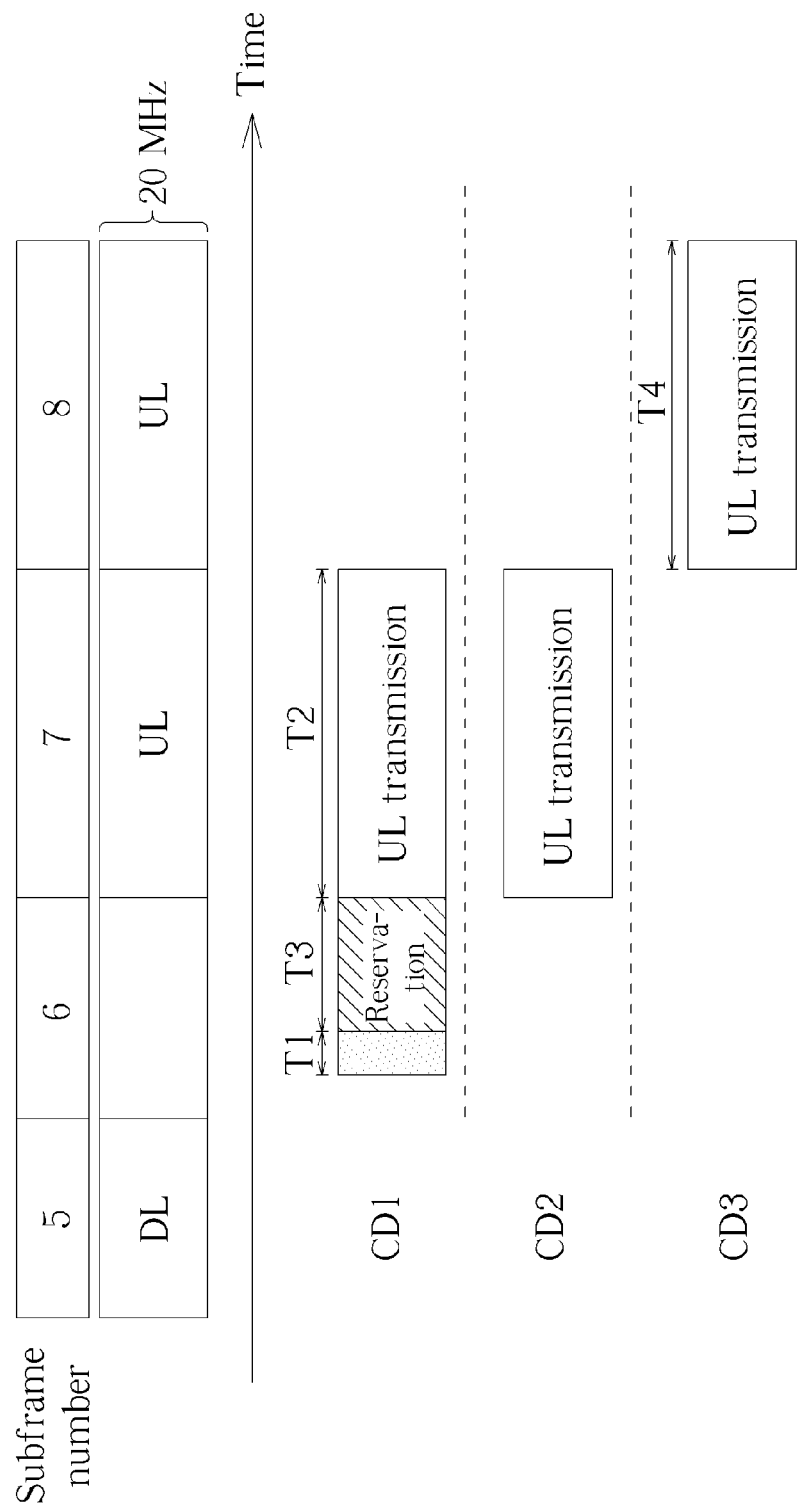
FIG. 7 is a schematic diagram of UL transmissions in an unlicensed band according to an example of the present invention.

FIG. 7 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD3 are considered to simplify the illustration. The communication device CD1 performs a CCA in a time interval T1 of the subframe 6. A result of the CCA may indicate that the time interval T1 is clear. Accordingly, the communication device CD1 performs a UL transmission with the network in a time interval T2 of the subframe 7. For example, the communication device CD1 may perform the UL transmission via one or more subcarriers of the time interval T2. The communication device CD1 transmits a reservation signal near a boundary of the subframe 7 according to a configuration for an occupancy of the unlicensed band transmitted by the network. In the present example, the communication device CD1 transmits the reservation signal in a time interval T3 of the subframe 6.

The communication devices CD2-CD3 do not perform the CCA, because the communication device CD1 is selected (e.g., as a representative) for performing the CCA. That is, the communication device CD1 is a representative for performing the CCA in the communication device group CDG1. Similarly, the communication devices CD2-CD3 do not transmit the reservation signal, because the communication device CD1 is also selected (e.g., as a representative) for transmitting the reservation signal. Accordingly, the communication devices CD2-CD3 can simply perform UL transmissions in the time interval T2 and a time interval T4 of the subframe 8, respectively. For example, the communication device CD1-CD2 may perform the UL transmissions via one or more subcarriers of the time interval T2 and the time interval T4, respectively. As can be seen, resources of the unlicensed band can be occupied by the communication device CD1, and preemption of the resources of the unlicensed band by a communication device operating a different communication standard is avoided. Thus, performance of the communication devices CD1-CD3 in the unlicensed band may approach that in the licensed band.

Figure 8:
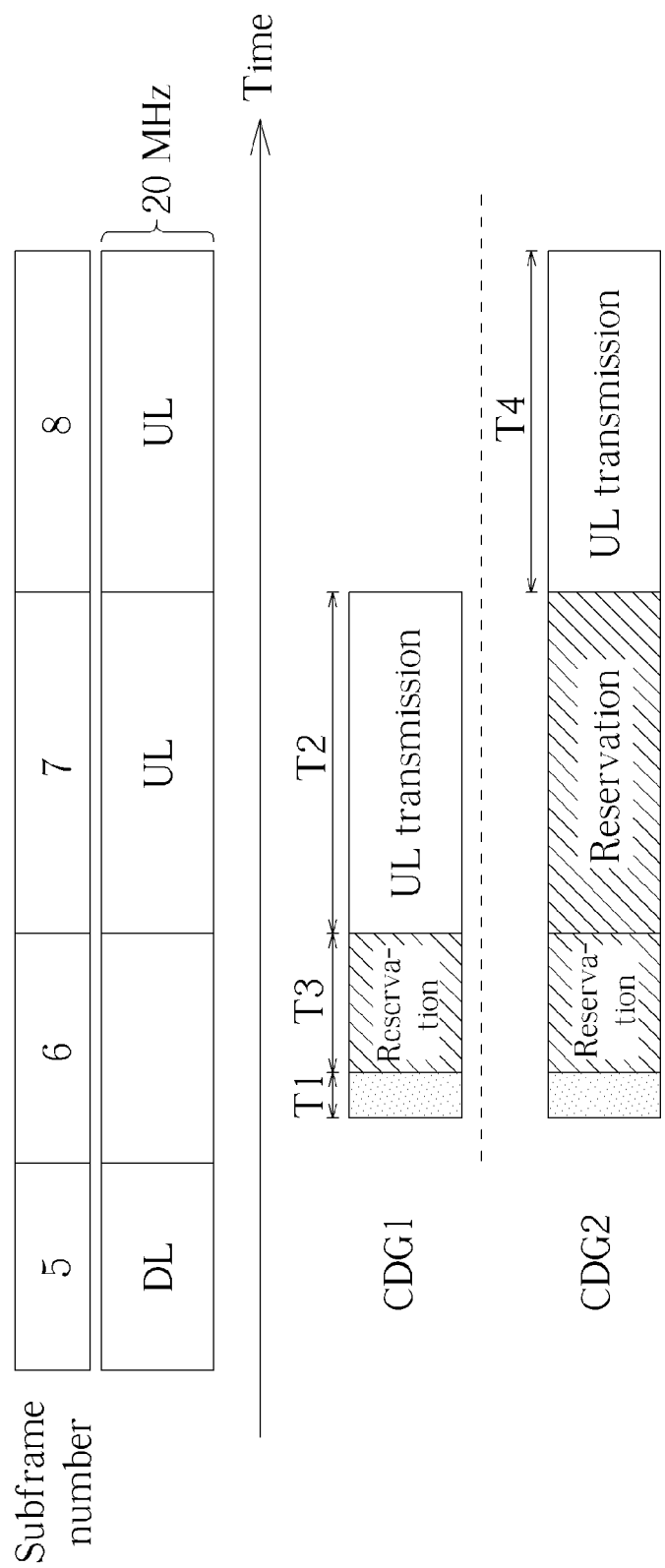
FIG. 8 is a schematic diagram of UL transmissions in an unlicensed band according to an example of the present invention.

FIG. 8 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD1 are considered to simplify the illustration. The communication device group CDG1 (i.e., one or more of the communication devices CD1-CD4) performs CCA(s) in a time interval T1 of the subframe 6. Result(s) of the CCA(s) may indicate that the time interval T1 is clear. Accordingly, the communication device group CDG1 performs UL transmissions with the network in a time interval T2 of the subframe 7. For example, the communication device group CDG1 may perform the UL transmission(s) via one or more subcarriers of the time interval T2. The communication device group CDG1 transmits reservation signal(s) near a boundary of the subframe 7 according to a configuration for an occupancy of the unlicensed band transmitted by the network. In the present example, the communication device group CDG1 transmits the reservation signal(s) in a time interval T3 of the subframe 6.

Similar to the operation of the communication device group CDG1, the communication device group CDG2 performs CCA(s) in a time interval T1 of the subframe 6. Result(s) of the CCA(s) may indicate that the time interval T1 is clear. Accordingly, the communication device group CDG2 performs UL transmission(s) with the network in a time interval T4 of the subframe 8. For example, the communication device group CDG2 may perform the UL transmission(s) via one or more subcarriers of the time interval T4. The communication device group CDG2 transmits the reservation signal(s) near the boundary of the subframe 8 according to a configuration for an occupancy of the unlicensed band transmitted by the network. In the present example, the communication device group CDG2 transmits the reservation signal(s) in the time interval T2 of the subframe 7. In addition, the communication device group CDG2 may further transmit the reservation signal(s) in the time interval T3 of the subframe 6 according to the configuration, after performing the CCA. As can be seen, resources of the unlicensed band can be occupied by the communication device groups CDG1-CDG2, and preemption of the resources of the unlicensed band by a communication device operating a different communication standard is avoided. Thus, performance of the communication device groups CDG1-CDG2 in the unlicensed band may approach that in the licensed band.

Figure 9:
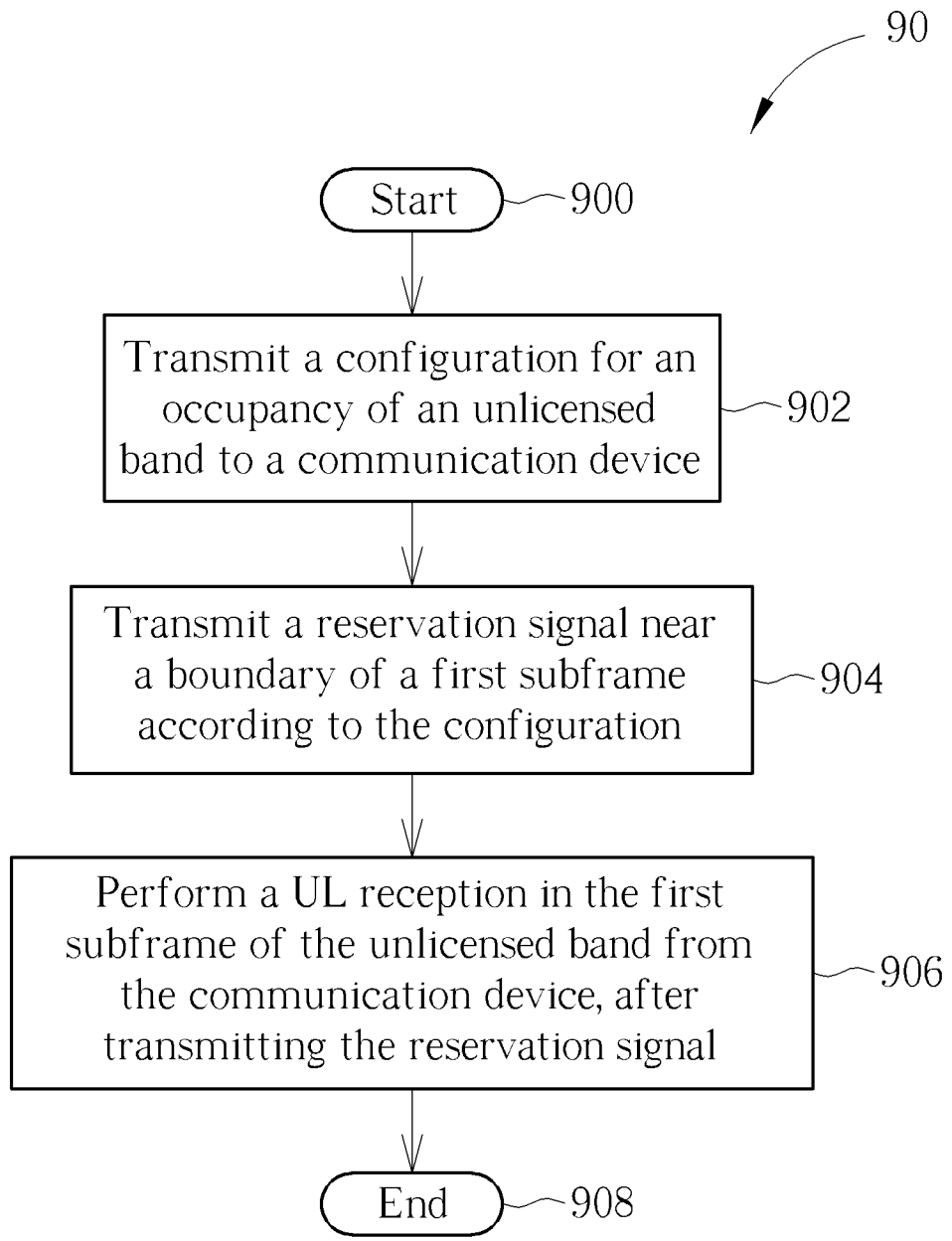
FIG. 9 is a flowchart of a process according to an example of the present invention.

FIG. 9 is a flowchart of a process 90 according to an example of the present invention. The process 90 may be utilized in the network (e.g., the base station BS0 and/or the LAA node LN0) shown in FIG. 1, to handle a transmission. The process 90 may be compiled into the program code 214 and includes the following steps:

Step 900: Start.

Step 902: Transmit a configuration for an occupancy of an unlicensed band to a communication device.

Step 904: Transmit a reservation signal near a boundary of a first subframe according to the configuration.

Step 906: Perform a UL reception in the first subframe of the unlicensed band from the communication device, after transmitting the reservation signal.

Step 908: End.

According to the process 90, the network may transmit a configuration for an occupancy of an unlicensed band to a communication device (e.g., the communication device CD1). The network may transmit a reservation signal near a boundary of a first subframe according to the configuration. The network may perform a UL reception in the first subframe of the unlicensed band from the communication device, after transmitting the reservation signal. That is, the network may transmit the reservation signal near the boundary of the first subframe to occupy resources of the unlicensed band for the communication device and/or other communication devices (e.g., any of the communication devices CD2-CD6) in the same system (e.g., LTE system, LTE-A system, etc.). Thus, resources of the unlicensed band can be occupied by the network, and preemption of the resources of the unlicensed band by a communication device operating a different communication standard is avoided. As a result, performance of the communication device in the unlicensed band may approach that in the licensed band.

Realization of the process 90 is not limited to the above description. The following examples may be applied for realizing the process 90.

In one example, the configuration may include a sequence (e.g., preamble sequence, code sequence, orthogonal sequence) for transmitting the reservation signal. In one example, the network may receive an assistance information (e.g., a geographic location of the communication device, a measurement result obtained by the communication device) related to the configuration from the communication device. Accordingly, the network may generate the configuration according to the assistance information.

In one example, the reservation signal may be transmitted in response to a reception of an occupancy success signal from the communication device, wherein the occupancy success signal is generated according to a result of a CCA performed in a time interval of the unlicensed band. That is, the network may transmit the reservation signal, after receiving the occupancy success signal indicating that the time interval is clear. In one example, the reservation signal may be transmitted at an end of the first subframe, may be transmitted at a start of a second subframe after the first subframe, or may be transmitted at an end of a third subframe before the first subframe. In one example, the communication device may transmit the reservation signal near another boundary of the first subframe according to the configuration. That is, both the network and the communication device transmit the reservation signal, e.g., at different time instants.

In one example, the communication device may belong to a first communication device group comprising a first plurality of communication devices, and the reservation signal may be transmitted to the first plurality of communication devices. In one example, the communication device may be selected (e.g., by the network) for performing the CCA. In one example, the first communication device group may be established according to a plurality of geographic locations of the first plurality of communication devices. In one example, the reservation signal may be specific for the first communication device group. That is, the reservation signal may not be used or recognized by a second communication device group. In one example, the reservation signal may be specific for the first communication device group and a second communication device group comprising a second plurality of communication devices. That is, the reservation signal may be used or recognized by multiple communication device groups. A communication device in the second communication device group may determine that the unlicensed band is clear, if it detects the reservation signal transmitted by a communication device in the first communication device group.

Figure 10:
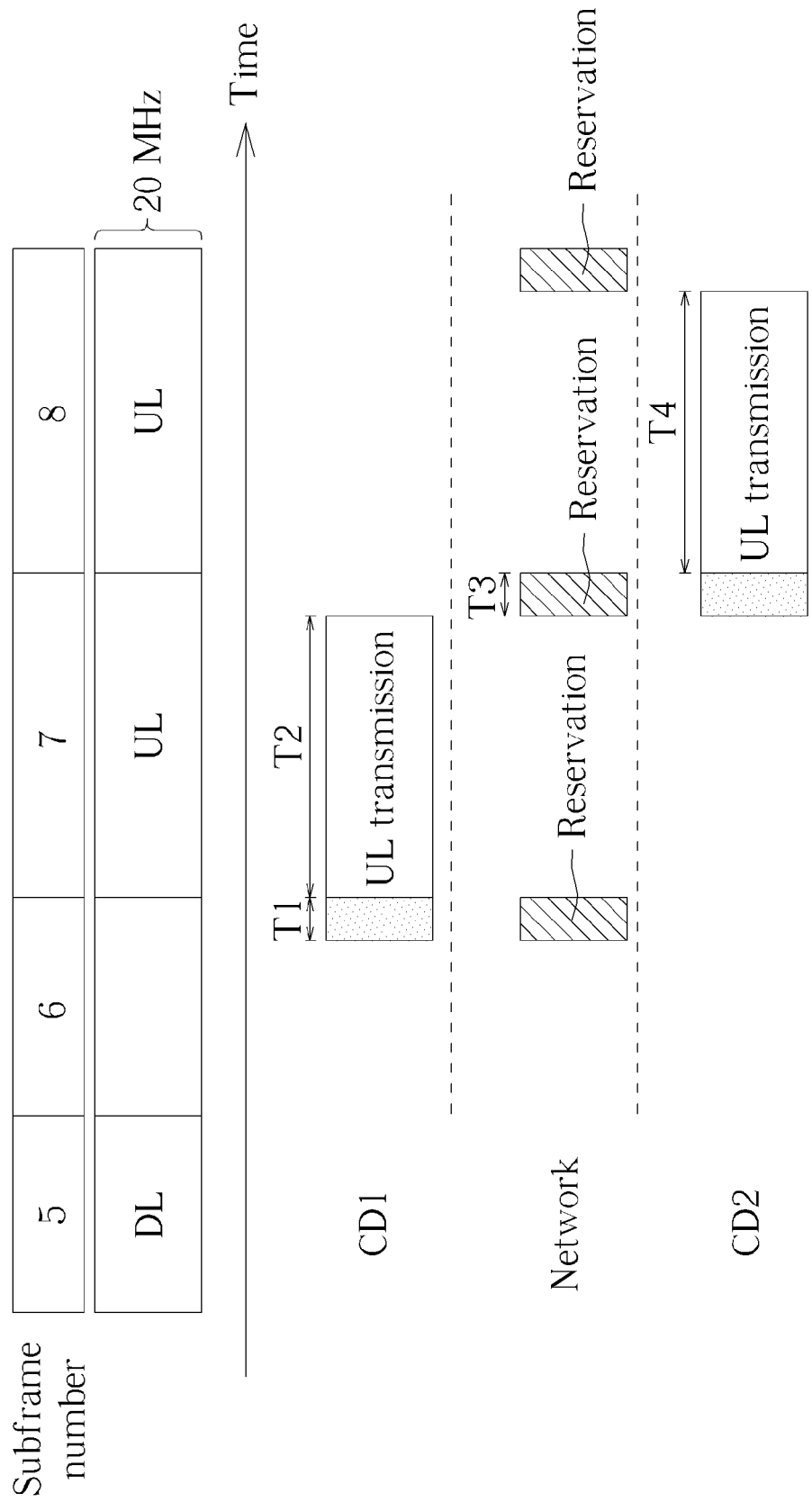
FIG. 10 is a schematic diagram of UL transmissions in an unlicensed band according to an example of the present invention.

FIG. 10 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD2 are considered to simplify the illustration. The network (e.g., the base station BS0 and/or the LAA node LN0) transmits a reservation signal near a boundary of the subframe 7 according to a configuration for an occupancy of the unlicensed band. In the present example, the network transmits the reservation signal in a time interval T1 of the subframe 6, i.e., the end of the subframe 6. The communication device CD1 performs a CCA in the time interval T1. A result of the CCA may indicate that the time interval T1 is clear. Accordingly, the communication device CD1 performs a UL transmission with the network in a time interval T2 of the subframe 7. For example, the communication device CD1 may perform the UL transmission via one or more subcarriers of the time interval T2.

Similarly, the network transmits (e.g., periodically) the reservation signal in a time interval T3 of the subframe 7, i.e., an end of the subframe 7. The communication device CD2 detects the reservation signal in the time interval T3 and determines that the unlicensed band is clear, after performing the CCA in the time interval T3. Similar to the operation of the communication device CD1, the communication device CD2 performs a UL transmission with the network in a time interval T4 of the subframe 8. For example, the communication device CD2 may perform the UL transmission via one or more subcarriers of the time interval T4. As can be seen, resources of the unlicensed band can be occupied by the network, and preemption of the resources of the unlicensed band by a communication device operating a different communication standard is avoided. Thus, performance of the communication devices CD1-CD2 in the unlicensed band may approach that in the licensed band.

Figure 11:
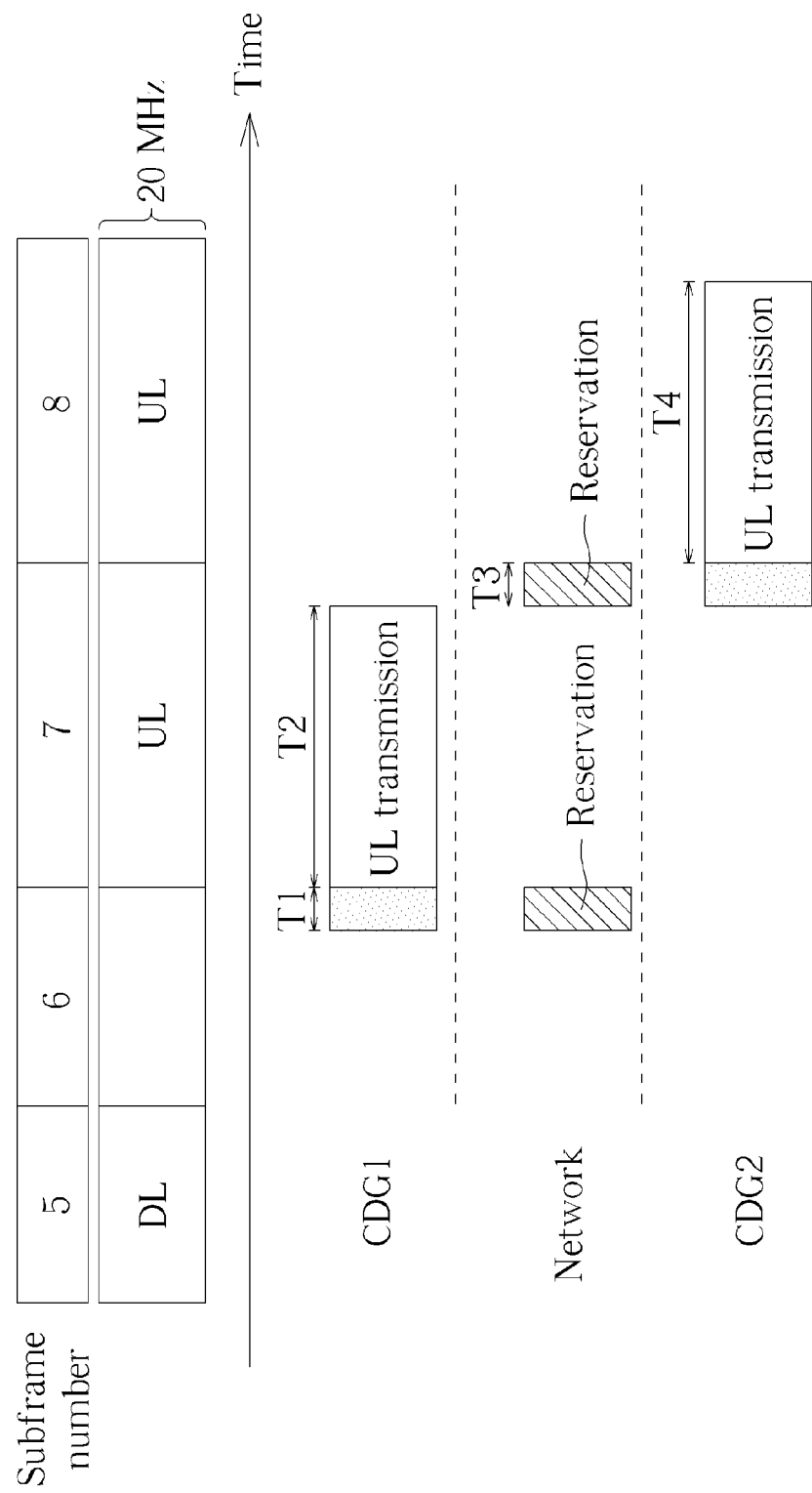
FIG. 11 is a schematic diagram of UL transmissions in an unlicensed band according to an example of the present invention.

FIG. 11 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. The network (e.g., the base station BS0 and/or the LAA node LN0) transmits a reservation signal near a boundary of the subframe 7 according to a configuration for an occupancy of the unlicensed band. In the present example, the network transmits the reservation signal in a time interval T1 of the subframe 6, i.e., the end of the subframe 6. The communication device group CDG1 (i.e., one or more of the communication devices CD1-CD4) performs CCA(s) in the time interval T1. Result(s) of the CCA(s) may indicate that the time interval T1 is clear. Accordingly, the communication device group CDG1 performs UL transmission(s) with the network in a time interval T2 of the subframe 7. For example, the communication device group CDG1 may perform the UL transmission(s) via one or more subcarriers of the time interval T2.

Similarly, the network transmits (e.g., periodically) the reservation signal in a time interval T3 of the subframe 7, i.e., an end of the subframe 7. The communication device group CDG2 (i.e., one or more of the communication devices CD5-CD6) detects the reservation signal in the time interval T3 and determines that the unlicensed band is clear, after performing CCA(s) in the time interval T3. Similar to the operation of the communication device group CDG1, the communication device group CDG2 performs UL transmission(s) with the network in a time interval T4 of the subframe 8. For example, the communication device group CDG2 may perform the UL transmission(s) via one or more subcarriers of the time interval T4. As can be seen, resources of the unlicensed band can be occupied by the network, and preemption of the resources of the unlicensed band by a communication device operating a different communication standard is avoided. Thus, performance of the communication device groups CDG1-CDG2 in the unlicensed band may approach that in the licensed band.

Figure 12:
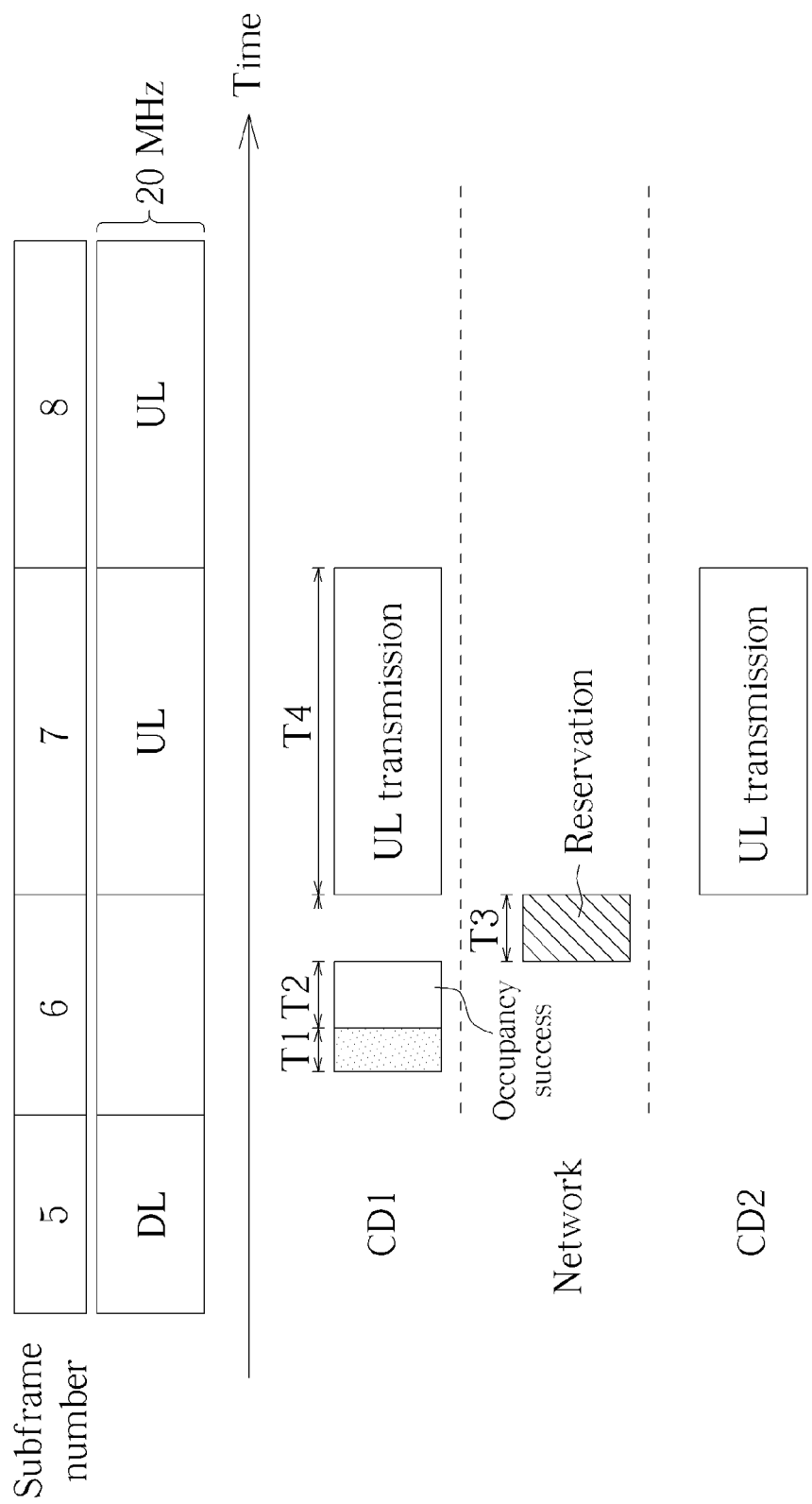
FIG. 12 is a schematic diagram of UL transmissions in an unlicensed band according to an example of the present invention.

FIG. 12 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD2 are considered to simplify the illustration. The communication device CD1 performs a CCA in a time interval T1 of the subframe 6. A result of the CCA may indicate that the time interval T1 is clear, e.g., according to a reservation signal detected in the time interval T1. Accordingly, the communication device CD1 transmits an occupancy success signal generated according to the result of the CCA to the network in a time interval T2 of the subframe 6, to notify the result of the CCA to the network. The network transmits a reservation signal near a boundary of the subframe 7 according to a configuration for an occupancy of the unlicensed band, in response to the reception of the occupancy success signal. In the present example, the network transmits the reservation signal in a time interval T3 of the subframe 6, i.e., the end of the subframe 6. The communication device CD1 does not need to perform the CCA again, e.g., according to the reception of the reservation signal in the time interval T3. Accordingly, the communication device CD1 performs a UL transmission with the network in a time interval T4 of the subframe 7. For example, the communication device CD1 may perform the UL transmission via one or more subcarriers of the time interval T4.

Similar to the operation of the communication device CD1, the communication device CD2 does not need to perform the CCA, e.g., according to the reception of the reservation signal in the time interval T3. The communication device CD2 performs a UL transmission with the network in the time interval T4. For example, the communication device CD2 may perform the UL transmission via one or more subcarriers of the time interval T4. As can be seen, resources of the unlicensed band can be occupied by the network, and preemption of the resources of the unlicensed band by a communication device operating a different communication standard is avoided. Thus, performance of the communication devices CD1-CD2 in the unlicensed band may approach that in the licensed band.

Figure 13:
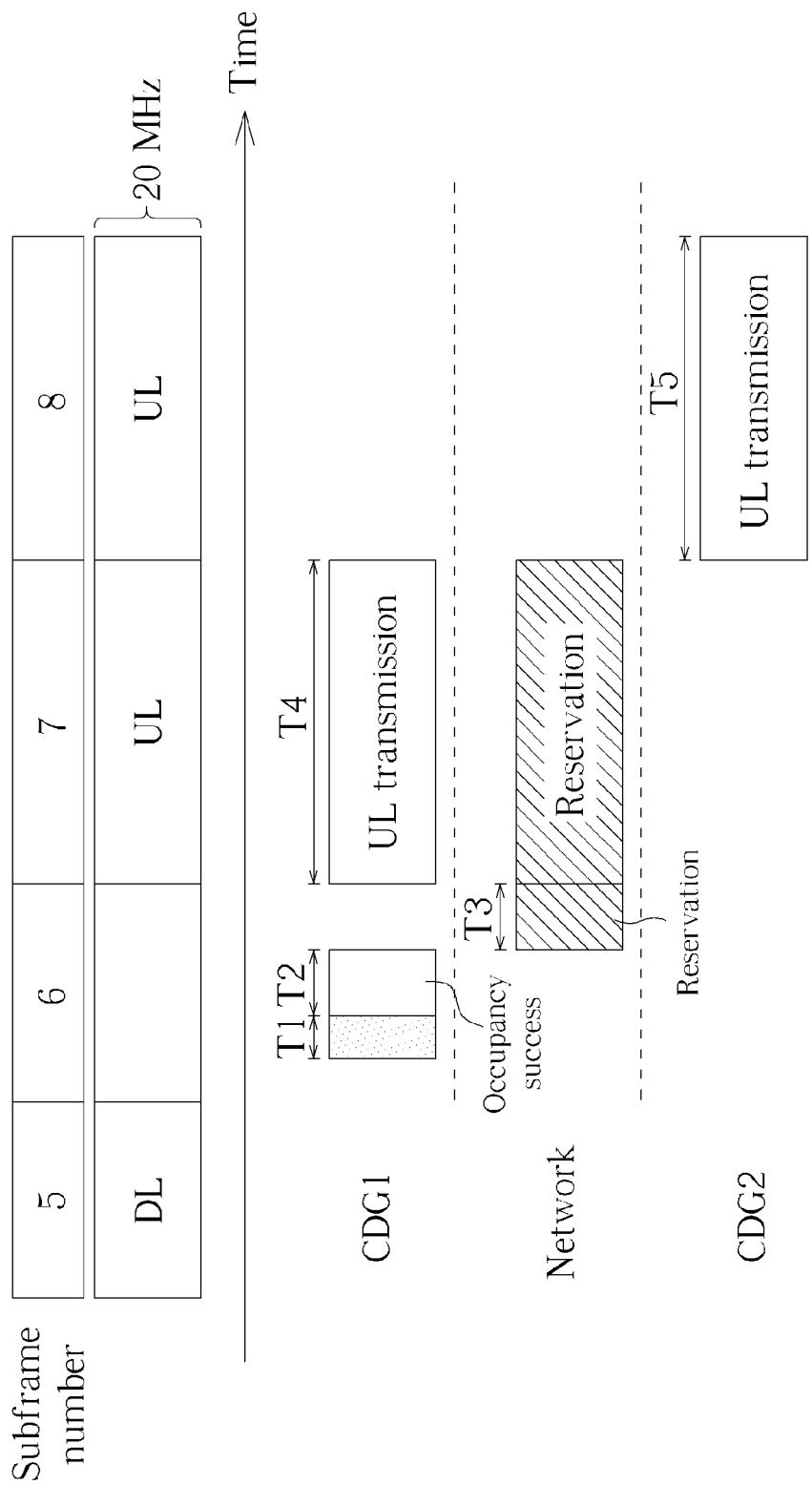
FIG. 13 is a schematic diagram of UL transmissions in an unlicensed band according to an example of the present invention.

FIG. 13 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. The communication device group CDG1 (i.e., one or more of the communication devices CD1-CD4) performs CCA(s) in a time interval T1 of the subframe 6. Result(s) of the CCA(s) may indicate that the time interval T1 is clear, e.g., according to a reservation signal detected in the time interval T1. Accordingly, the communication device group CDG1 transmits occupancy success signal(s) generated according to the result(s) of the CCA(s) to the network in a time interval T2 of the subframe 6, to notify the result of the CCA to the network. The network transmits a reservation signal near a boundary of the subframe 7 according to a configuration for an occupancy of the unlicensed band, in response to the reception(s) of the occupancy success signal(s). In the present example, the network transmits the reservation signal in a time interval T3 of the subframe 6, i.e., the end of the subframe 6. The communication device group CDG1 does not need to perform the CCA(s) again, e.g., according to the reception of the reservation signal in the time interval T3. Accordingly, the communication device group CDG1 performs UL transmission(s) with the network in a time interval T4 of the subframe 7. For example, the communication device group CDG1 may perform the UL transmission(s) via one or more subcarriers of the time interval T4.

In addition, the network further transmits the reservation signal in the time interval T4, to occupy the unlicensed band for the communication device group CDG2. Similar to the operation of the communication device group CDG1, the communication device group CDG2 (i.e., one or more of the communication devices CD5-CD6) does not need to perform the CCA(s), e.g., according to the reception of the reservation signal in the time interval T4. The communication device group CDG2 performs UL transmission(s) with the network in a time interval T5 of the subframe 8. For example, the communication device group CDG2 may perform the UL transmission(s) via one or more subcarriers of the time interval T5. As can be seen, resources of the unlicensed band can be occupied by the network, and preemption of the resources of the unlicensed band by a communication device operating a different communication standard is avoided. Thus, performance of the communication device groups CDG1-CDG2 in the unlicensed band may approach that in the licensed band.

Figure 14:
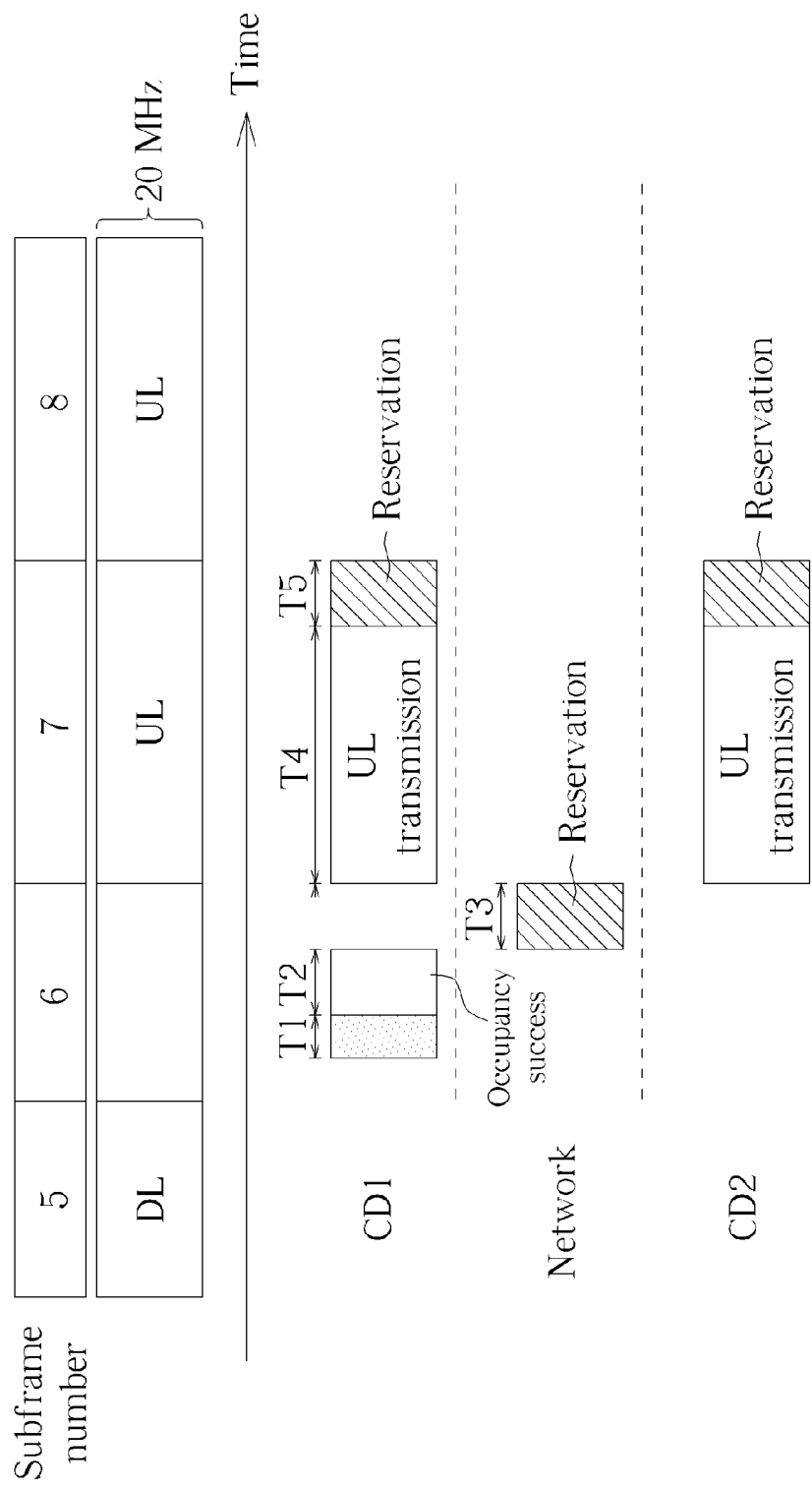
FIG. 14 is a schematic diagram of UL transmissions in an unlicensed band according to an example of the present invention.

FIG. 14 is a schematic diagram of UL transmissions in an unlicensed band according to an example of the present invention. There are 4 subframes 5-8, wherein the subframe 5 is a DL subframe, and the subframes 7-8 are UL subframes. The subframe 6 may be a flexible subframe, but is not limited herein. As an example, a bandwidth of the subframes is 20 MHz. Operations of the communication devices CD1-CD2 are considered to simplify the illustration. The communication device CD1 performs a CCA in a time interval T1 of the subframe 6. A result of the CCA may indicate that the time interval T1 is clear, e.g., according to a reservation signal detected in the time interval T1. Accordingly, the communication device CD1 transmits an occupancy success signal generated according to the result of the CCA to the network in a time interval T2 of the subframe 6, to notify the result of the CCA to the network. The network transmits a reservation signal near a boundary of the subframe 7 according to a configuration for an occupancy of the unlicensed band, in response to the reception of the occupancy success signal. In the present example, the network transmits the reservation signal in a time interval T3 of the subframe 6, i.e., the end of the subframe 6. The communication device CD1 does not need to perform the CCA again, e.g., according to the reception of the reservation signal in the time interval T3. Accordingly, the communication device CD1 performs a UL transmission with the network in a time interval T4 of the subframe 7. For example, the communication device CD1 may perform the UL transmission via one or more subcarriers of the time interval T4. In addition, the communication device CD1 transmits the reservation signal in a time interval T5 of the subframe 7, i.e., the end of the subframe 7.

Similar to the operation of the communication device CD1, the communication device CD2 does not need to perform the CCA, e.g., according to the reception of the reservation signal in the time interval T3. The communication device CD2 performs a UL transmission with the network in the time interval T4. For example, the communication device CD2 may perform the UL transmission via one or more subcarriers of the time interval T4. In addition, the communication device CD2 transmits the reservation signal in the time interval T5, i.e., the end of the subframe 7. As can be seen, resources of the unlicensed band can be occupied by the network, and preemption of the resources of the unlicensed band by a communication device operating a different communication standard is avoided. Thus, performance of the communication devices CD1-CD2 in the unlicensed band may approach that in the licensed band.

It should be noted that a reservation signal mentioned above may also be any signal (e.g., a feedback signal, a response signal) capable of being recognized by a communication device operating the same communication standard, but is not limited herein. A communication device group performing an operation (e.g., transmission and/or reception) may mean that only one communication device in the communication device group performs the operation or may mean that two or more communication devices in the communication device group perform the operation. In addition, the features and/or the operations of a communication device mentioned above may imply corresponding features and/or operations of the network, but is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides device and a method for handling a transmission in an unlicensed band. Thus, resources of the unlicensed band can be occupied by a network and/or communication device(s), and preemption of the resources of the unlicensed band by a communication device operating a different communication standard is avoided. As a result, performance of the communication devices in the unlicensed band may approach that in the licensed band.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a transmission in an unlicensed band, comprising:
   a storage unit, for storing instructions of:
   receiving a configuration for an occupancy of an unlicensed band;
   performing a clear channel assessment (CCA) in a time interval of the unlicensed band;
   performing an uplink (UL) transmission in a first subframe of the unlicensed band according to a result of the CCA;
   determining whether to transmit a reservation signal near a boundary of the first subframe according to the configuration;
   transmitting the reservation signal at an end of the first subframe, at a start of a second subframe after the first subframe, at an end of a third subframe before the first subframe or in at least one subframe before the first subframe, according to the configuration after performing the CCA; and
   not transmitting the reservation signal according to the configuration, when the configuration instructs the communication device not to transmit the reservation signal; and
   a processing circuit, coupled to the storage unit, configured to execute the instructions stored in the storage unit.

2. The communication device of claim 1, wherein the configuration comprises a sequence for transmitting the reservation signal.

3. The communication of claim 1, wherein the storage unit further stores the instruction of:
   transmitting an assistance information related to the configuration.

4. The communication device of claim 1, wherein the result of the CCA indicates that the time interval is clear, if the reservation signal is detected by the communication device.

5. The communication device of claim 1, wherein the communication device belongs to a first communication device group comprising a first plurality of communication devices, and the reservation signal is transmitted to the first plurality of communication devices.

6. The communication device of claim 5, wherein the communication device is selected for performing the CCA.

7. The communication device of claim 5, wherein the communication device is selected for transmitting the reservation signal for the first communication device group.

8. The communication device of claim 5, wherein the first communication device group is established according to a plurality of geographic locations of the first plurality of communication devices.

9. The communication device of claim 5, wherein the reservation signal is specific for the first communication device group.

10. The communication device of claim 5, wherein the reservation signal is specific for the first communication device group and a second communication device group comprising a second plurality of communication devices.

11. A method for handling a reception in an unlicensed band, comprising:
   a network transmitting a configuration for an occupancy of an unlicensed band to a communication device;
   the network determining whether to transmit a reservation signal near a boundary of a first subframe according to the configuration;
   the network transmitting the reservation signal at an end of the first subframe, at a start of a second subframe after the first subframe or at an end of a third subframe before the first subframe according to the configuration;
   the network not transmitting the reservation signal, when the configuration instructs the network not to transmit the reservation signal; and
   the network performing an uplink (UL) reception in the first subframe of the unlicensed band from the communication device, after transmitting the reservation signal or a downlink (DL) subframe.

12. The method of claim 11, wherein the configuration comprises a sequence for transmitting the reservation signal.

13. The method of claim 11, wherein the method further comprises the steps of:
   the network receiving an assistance information related to the configuration from the communication device; and
   the network generating the configuration according to the assistance information.

14. The method of claim 11, wherein the reservation signal is transmitted in response to a reception of an occupancy success signal from the communication device, wherein the occupancy success signal is generated according to a result of a clear channel assessment (CCA) performed in a time interval of the unlicensed band.

15. The method of claim 11, wherein the method further comprises the steps of:

the communication device transmitting the reservation signal near another boundary of the first subframe according to the configuration.

16. The method of claim 11, wherein the communication device belongs to a first communication device group comprising a first plurality of communication devices, and the reservation signal is transmitted to the first plurality of communication devices.

17. The method of claim 16, wherein the first communication device group is established according to a plurality of geographic locations of the first plurality of communication devices.

18. The method of claim 16, wherein the reservation signal is specific for the first communication device group.

19. The method of claim 16, wherein the reservation signal is specific for the first communication device group and a second communication device group comprising a second plurality of communication devices.

20. A network for handling a reception in an unlicensed band, comprising:
   a storage unit, for storing instructions of:
      transmitting a configuration for an occupancy of an unlicensed band to a communication device;
      determining whether to transmit a reservation signal near a boundary of a first subframe according to the configuration;
      transmitting the reservation signal at an end of the first subframe, at a start of a second subframe after the first subframe or at an end of a third subframe before the first subframe according to the configuration;
      not transmitting the reservation signal, when the configuration instructs not to transmit the reservation signal; and
      performing an uplink (UL) reception in the first subframe of the unlicensed band from the communication device, after transmitting the reservation signal or a downlink (DL) subframe; and
   a processing circuit, coupled to the storage unit, configured to execute the instructions stored in the storage unit.

21. The network of claim 20, wherein the configuration comprises a sequence for transmitting the reservation signal.

22. The network of claim 20, wherein the storage unit further stores the instruction of:
   receiving an assistance information related to the configuration from the communication device; and
   generating the configuration according to the assistance information.

23. The network of claim 20, wherein the reservation signal is transmitted in response to a reception of an occupancy success signal from the communication device, wherein the occupancy success signal is generated according to a result of a clear channel assessment (CCA) performed in a time interval of the unlicensed band.

* * * * *